United States Patent
Shibata et al.

[11] 3,737,234
[45] June 5, 1973

[54] SPECTROPHOTOMETER FOR MEASUREMENT OF DERIVATIVE SPECTRA

[75] Inventors: Kazuo Shibata, Tokyo; Takashi Kurita, Kyoto, both of Japan

[73] Assignee: Shimadzu Seisakusho Ltd., Kyoto, Japan

[22] Filed: Dec. 17, 1970

[21] Appl. No.: 99,140

Related U.S. Application Data

[63] Continuation-in-part of Ser. No. 571,458, Aug. 10, 1966, abandoned.

[52] U.S. Cl. ..........................356/88, 356/95, 356/97
[51] Int. Cl. .................................................G01j 3/42
[58] Field of Search ..............................250/43.5 R; 356/88–98

[56] References Cited

UNITED STATES PATENTS

| | | | |
|---|---|---|---|
| 3,211,051 | 10/1965 | Frei et al. | 356/97 |
| 2,547,212 | 4/1951 | Jamison et al. | 250/43.5 R |
| 2,650,307 | 8/1953 | Koppius | 250/43.5 R |
| 3,520,614 | 7/1970 | Goldstein | 356/95 X |
| 3,547,542 | 12/1970 | Bulpitt et al. | 356/88 X |

*Primary Examiner*—Ronald L. Wibert
*Assistant Examiner*—F. L. Evans
*Attorney*—Fidelman, Wolffe & Leitner

[57] ABSTRACT

A spectrophotometer for measurement of the derivative spectra of substances, comprising a monochromatic light source having a spectral bandwidth, a beam divider for dividing the light from the light source into two beams, masks separate from and positioned optically downstream from the beam divider for partially masking the beams so that the unmasked portion of each of the beams has a nominal wavelength different by a predetermined value from that of the unmasked portion of the other beam, a sample container so arranged as to receive the unmasked portions of the light beams and a detector to measure the intensities of light beams transmitted through the sample cells.

5 Claims, 9 Drawing Figures

SPECTROPHOTOMETER FOR MEASUREMENT OF DERIVATIVE SPECTRA

This invention is a continuation-in-part application of earlier-filed pending application Ser. No. 571,458, filed Aug. 10, 1966 now abandoned.

This invention relates generally to absorption spectrophotometry and more particularly to a spectrophotometer which is capable of measuring the derivative spectra of various substances.

It is well known that an absorption spectrum of a substance, especially a biological one, obtained by the usual method of spectrophotometric measurement often shows a single absorption band where there should actually appear a plurality of overlapping absorption bands, or an obscure shoulder where there is a weak absorption band superimposed on the steep slope of a sharp absorption band. The corresponding derivative spectrum, however, can resolve such an apparently single band into its actual components, or show such a shoulder as a distinct absorption band.

One prior art instrument for measurement of derivative spectra employs a pair of monochromators each adapted to provide a monochromatic light of a wavelength slightly different from that provided by the other monochromator. The two monochromatic light beams are passed through the same sample contained in a pair of cells, and by measuring the ratio of the intensitites of light transmitted through the respective cells, the derivative spectrum of the sample is obtained. This instrument has the disadvantage that it requires two monochromators, and that it is very difficult to carry out scanning with the same difference being always kept between the wavelengths of the light beams of the two monochromators.

Another prior art instrument employs a vibrating slit mechanism to provide alternating monochromatic light beams of slightly different wavelengths, together with two servo systems for compensating for variation of the sensitivity of the photoelectric tubes and the light intensity with wavelength, and complicated electric circuits for recording derivative spectra. The disadvantage here is that the arrangements are rather complicated.

Accordingly, it is one object of the invention to provide a spectrophotometer which is capable of measuring the first derivative spectra of various substances.

Another object of the invention is to provide such a spectrophotometer as aforesaid which is very simple in construction, employing a single double-beam monochromator.

Another object of the invention is to provide such a spectrophotometer as aforesaid which is easy for manufacture with a high degree of precision.

A further object of the invention is to provide such a spectrophotometer as aforesaid, utilizing the system of any conventional double-beam spectrophotometer.

Still another object of the invention is to make it possible to convert any conventional double-beam type of spectrophotometer into the one which is capable of measuring the derivative spectra of substances, without any modification of the basic arrangement of the instrument, but with addition of only two simple masks.

Other objects, features and advantages of the invention will become more apparent from the following course of specification, reference being had to the accompanying drawings, wherein.

Figure 1:
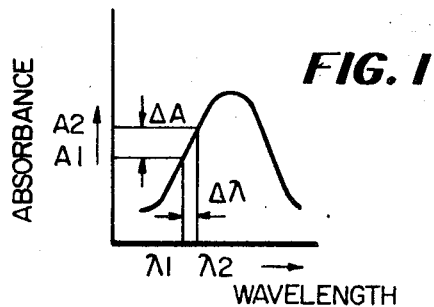
FIG. 1 is a graph showing a hypothetical absorption spectrum obtained by the usual method of measurement.
Figure 2:
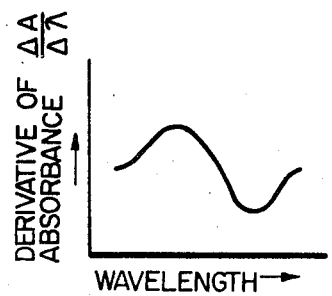
FIG. 2 shows the derivative spectrum of a sample having the hypothetical absorption spectrum of FIG. 1.

Now referring in detail to the drawings, first to FIG. 1, there is shown a hypothetical absorption curve of a sample plotted against wavelength. Let the absorbances at wavelengths of $\lambda_1$ and $\lambda_2$ be $A_1$ and $A_2$, respectively, and the following equations will be obtained:

$$A_1 = \log (I_{o1}/I_{t1}) \quad (1)$$
$$A_2 = \log (I_{o2}/I_{t2}) \quad (2)$$

where $I_{o1}$ is the intensity of light incident on the sample at a wavelength of $\lambda_1$; $I_{o2}$ is the intensity of light incident on the sample at a wavelength of $\lambda_2$; $I_{t1}$ is the intensity of light transmitted through the sample at the wavelength of $\lambda_1$; and $I_{t2}$ is the intensity of light transmitted through the sample at the wavelength of $\lambda_2$.

If $A_2 - A_1 = \Delta A$, then $$\Delta A = \log (I_{o2}/I_{t2}) - \log (I_{o1}/I_{t1}) \quad (3)$$

Under the condition that the intensities of the two incident light beams $I_{o1}$ and $I_{o2}$ are equal, the equation (3) can be expressed as:

$$\Delta A = \log (I_{t1}/I_{t2}) \quad (4)$$

If both sides of this equation (4) are divided by $\Delta\lambda$, then $$\Delta A/\Delta \lambda = (1/\Delta\lambda) \log (I_{t1}/I_{t2}) \quad (5)$$

On the other hand, the differential value of the absorbance $A$ of the sample with respect to wavelength $\lambda$ is given as:

$$dA/d\lambda = \lim_{\Delta\lambda > 0} \Delta A/\Delta\lambda \quad (6)$$

If in equation (5) the value $\Delta\lambda$ is kept constant at nearly zero, the value of $\Delta A/\Delta\lambda$ can be considered as being approximately equal to $dA/d\lambda$. This means that measurement of $\Delta A/\Delta\lambda$ with continuous wavelength scanning will approximately give the derivative spectrum of the sample.

Figure 3:
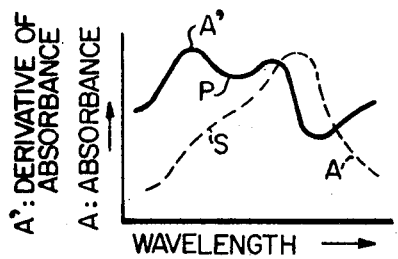
FIG. 3 is a graph showing a hypothetical absorption spectrum obtained by the ordinary method and the derivative thereof, for illustration of how an obscure shoulder in the ordinary absorption curve appears as a distinct absorption band in the derivative curve.

As previously mentioned, derivative spectra are useful in detecting overlapping absorption bands appearing as a single band or a distinct absorption band appearing as an obscure shoulder in a usual absorption spectrum. As shown in FIG. 3, a usual absorption curve is plotted with an obscure shoulder S, which clearly appears as a deep dip P in the derivative curve A'.

According to the present invention there is provided a spectrophotometer for measurement of derivative spectra of substances, which comprises a monochormatic light source having a certain spectral bandwidth and a beam divider for dividing the light from the light source into two beams. The characteristic of the invention is that to obtain the derivative of spectra of substances to be measured, there are provided a pair of masks separate from and positioned optically downstream from the beam divider for partially masking the two beams so that the unmasked portion of each of the beams has a wavelength different by a predetermined value from that of the unmasked portion of the other beam. In one embodiment of the invention, the unmasked portions of the two beams are passed through two sample cells containing the same sample, respectively, and the light beams transmitted through the sample cells are received by two detectors, which produce electrical signals corresponding to the intensities of the transmitted light beams. In another embodiment of the invention, the unmasked portions of the two beams are alternately passed through the single sample cell and the light beams transmitted through the single sample cell are received by a single detector, which produces electrical signals corresponding to the intensities of the transmitted light beams.

The electrical signals are processed by means of a suitable electrical circuit to provide a logarithmic ratio of the signals, which is plotted against wavelength to provide a derivative spectrum of the substance being measured.

Figure 4:
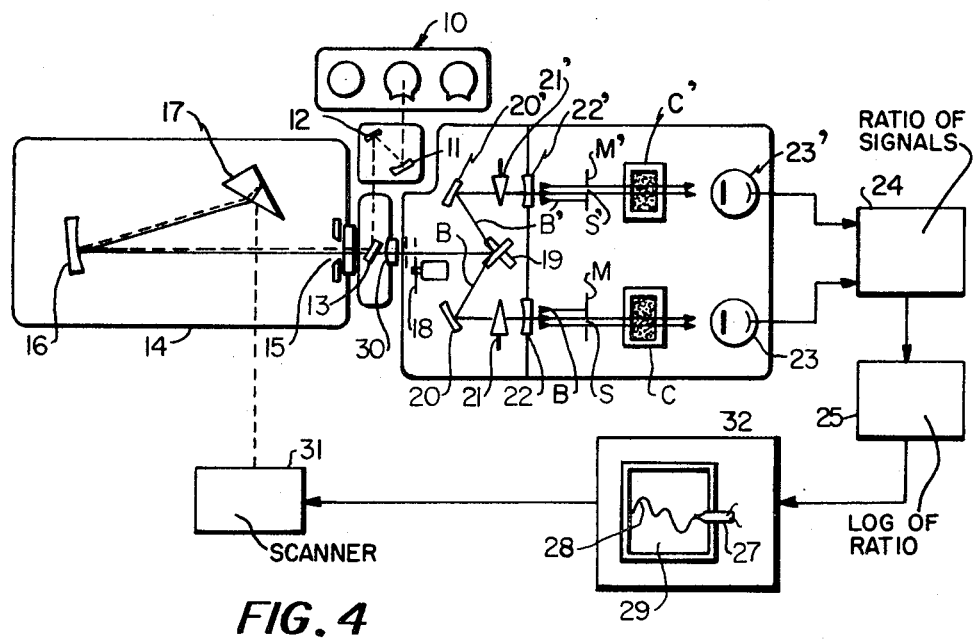
FIG. 4 is a schematic showing of one embodiment of the invention.

Turning now to FIG. 4 which shows one embodiment of the invention, there is shown a light source 10. The light from the source is reflected by a concave mirror 11 and a pair of plane mirrors 12 and 13 to enter a monochromator 14 through an entrance slit 15 and hit on a collimator mirror 16. The collimator mirror 16 makes the light rays parallel and directs them to a prism 17, which is driven by a wavelength (or wavenumber) scanning device 31 in a manner well known in the art. The prism disperses the light rays into different wavelengths, which are directed back to the collimator mirror 16 and again passed through the slit 15. The slit passes a monochromatic light of a selected spectral bandwidth, which passes through a collimator lens 30 and a chopper 18 to a beam splitter 19. The beam splitter splits the monochromatic light rays into two beams B and B', which are reflected by concave mirrors 20 and 20' to pass through optical attenuators 21 and 21', cylindrical lenses 22 and 22' and sample cells C and C', respectively. For measurement of a derivative spectrum, the two cells contain the same sample. The light beams transmitted through the cells are received by a pair of photomultiplier tubes 23 and 23', which produce corresponding outputs.

The outputs from the tubes 23 and 23' may be applied to a suitable circuit 24 which is so designed as to provide a signal corresponding to the ratio of the two signals from the tubes. The output from the circuit 24 is applied to a circuit 25 which is so designed as to provide a signal corresponding to the logarithm of the ratio. The output from the circuit 25 is applied to a recorder 32. If the chart 29 of the recorder is moved in accordance with the wavelength or wavenumber scanning by the device 31, a pen 27 draws a derivative spectrum 28 on the chart 29.

Figure 5A:
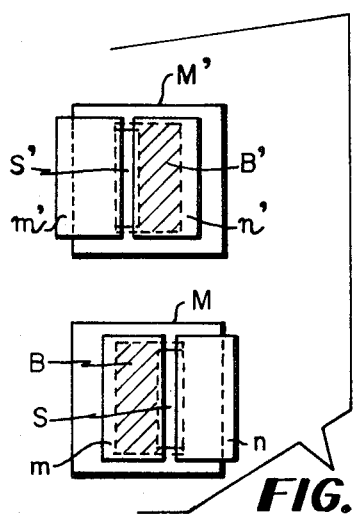
FIG. 5a is a view similar to FIG. 5 showing an arrangement to vary the width of the slits of the masks.
Figure 5:
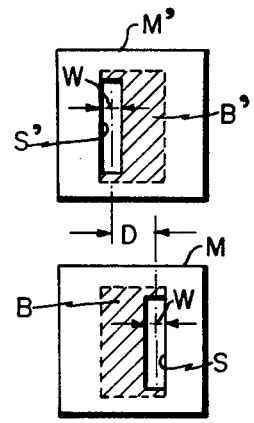
FIG. 5 is a schematic elevational view of the pair of masks with their respective slits shown in FIG. 4.

Characteristic of the invention is the provision of a pair of masks M and M' for obtaining beams of slightly different wavelengths in the two paths of the beams B and B' in front of the cells C and C', respectively. The masks M and M' are positioned in the image plane of the slit 15 of the monochromator and formed with slits S and S', respectively. The slits are of the same width and, as most clearly shown in FIG. 5, so formed that the position of the slit S relative to the optical axis of the beam B is displaced from that of the slit S' relative to the optical axis of the beam B'. In the illustrated embodiment, the slit S on the mask M is displaced slightly (for example, 0.5 m$\mu$ around $\lambda$ = 400 m$\mu$) toward the longer wavelengths while the slit S' on the mask M' is displaced symmetrically toward the shorter wavelengths. Thus, the two beams B and B' have their respective symmetrical portions intercepted by the masks M and M'. Consequently, although the two beams that have been split from the same single monochromatic beam have the same small spectral bandwidth, there comes to exist a slight difference $\Delta\lambda$ between the two nominal wavelengths $\lambda_2$ and $\lambda_1$ of the beams that have passed through the slits S and S'. Then the sample in the cell C receives the light from the slit S, the nominal wavelength of which is $\lambda_2$ and the intensity of which is $I_{o2}$, while the sample in the cell C' receives the light from the slit S', the nominal wavelength of which is $\lambda_1$ and the intensity of which is $I_{o1}$. The light beams transmitted through the sample in the cells C and C' are reduced to the intensities of $I_{t2}$ and $I_{t1}$, respectively, which are detected by the photomultiplier tubes 23 and 23'. The output signals of the tubes are amplified and demodulated and then measured as the ratio of $I_{t1}/I_{t2}$, the logarithm of which gives the absorbance difference between the two wavelengths $\lambda_1$ and $\lambda_2$. Thus, the derivative spectrum of the sample can be continuously recorded against wavelength $\lambda$, as previously mentioned.

It will be easily understood that by varying the width $w$ of the slits S and S' and/or the central distance D (FIG. 5) between the slits within the spectral bandwidth of the beams hitting the masks, it is possible to vary the value of $\Delta\lambda$. The width $w$ of the slits S, S' may be varied by providing a pair of plates $m$, $n$ and $m'$, $n'$, which are slidably secured to the masks M, M' so as to be movable toward and away from each other in front of the slits S, S'.

Figure 6:
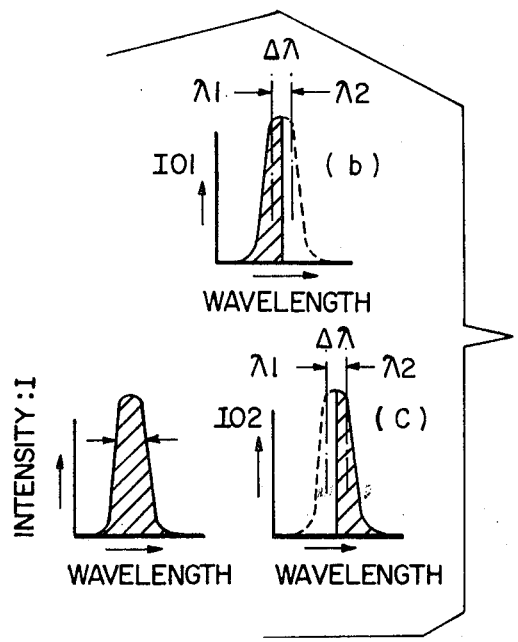
FIG. 6 shows graphs illustrating how the two monochromatic light beams at slightly different wavelengths are partially and symmetrically intercepted by the masks of the invention.

FIG. 6 shows the principle of the simplest method of masking, that is, one-half masking of the light beams B and B' incident on the sample cells C and C'. Suppose that the beams B and B' have the spectral intensity distribution as plotted against wavelength in FIG. 6a. One-half of one of the beams is masked so that the nominal wavelength of the unmasked portion (shown hatched in the Figures) of the beam is slightly shifted say, to $\lambda_1$ as shown in FIG. 6b. The opposite one-half of the other beam is shifted to $\lambda_2$ as shown in FIG. 6c. Thus, a difference $\Delta\lambda = \lambda_2 - \lambda_1$ is produced between the two light beams incident on the sample cells C and C'.

Figure 7:
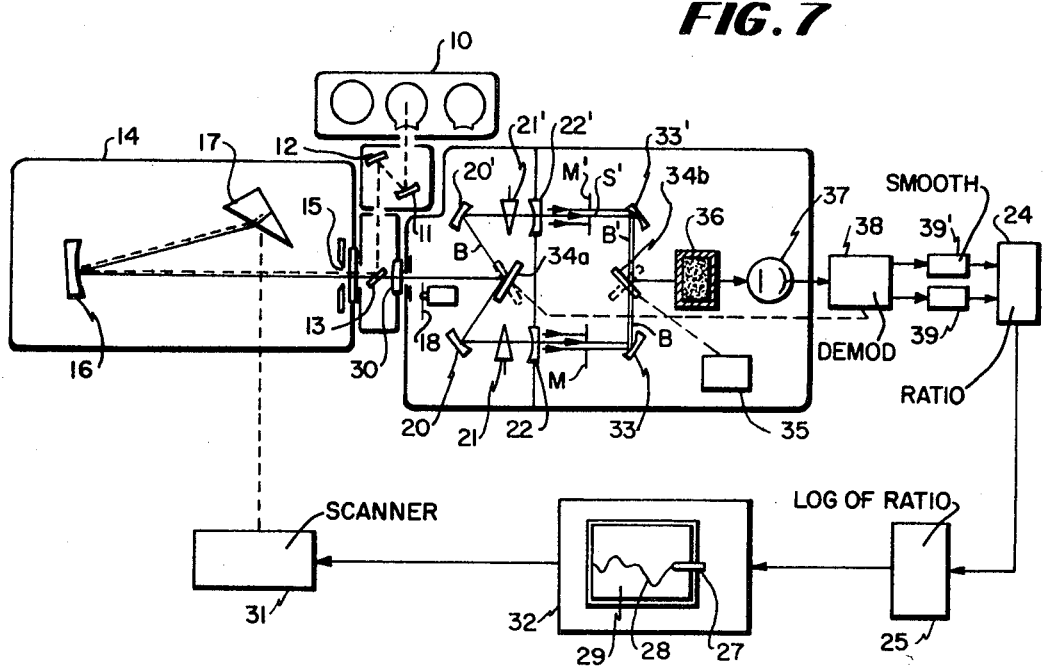
FIG. 7 is a diagram of another embodiment of the invention.

FIG. 7 shows another embodiment of the invention, wherein a single cell and a single photomultiplier tube are employed instead of the two cells C, C' and the two photomultiplier tubes 23, 23' in FIG. 4. In FIG. 7, the same reference symbols and numerals as in FIG. 4 denote corresponding parts. The beam coming out of the slit 15 is directed by a beam switch 34a alternately onto the concave mirrors 20 and 20'. The two alternate beams B and B' pass through the attenuators 21 and 21', the lenses 22 and 22' and the masks M and M' and are reflected by a pair of mirrors 33 and 33' to be alternately projected onto a second beam switch 34b. The two beam switches 34a and 34b are synchronously driven by a suitable drive 35. The switch 34b causes the two beams to alternately pass through a single cell 36 into a single photomultiplier tube 37. The alternate outputs corresponding to the absorption of the sample at the two slightly different wavelengths are demodulated by a demodulator 38 which is synchronized with the operation of switches 34a and 34b. The outputs from the demodulator 38 are applied to smoothing circuits 39 and 39', the outputs from which are applied to the ratio calculating circuit 24. The other component parts and the operation of the system of FIG. 7 are the same as in FIG. 4 so that no further explanation will be required.

Figure 8:
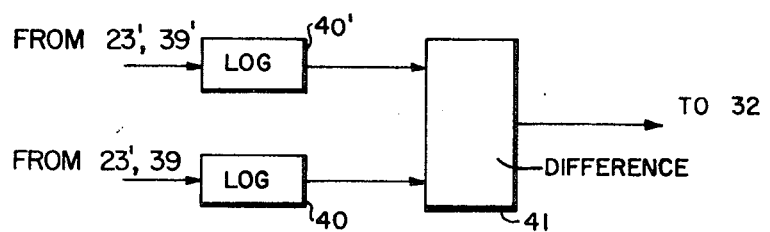
FIG. 8 is a diagram of an electrical circuit which can replace the corresponding circuits in FIGS. 4 and 7.

In FIGS. 4 and 7, first the ratio of the two outputs from the tubes 23 and 23' or the smoothing circuits 39 and 39' is calculated and then the logarithm of the ratio is provided. However, the arrangement may also be such that a signal corresponding to the logarithm of each of the two outputs is first obtained and then the difference between the two logarithms is calculated. FIG. 8 shows such an arrangement. The outputs from the tubes 23 and 23' in FIG. 4 or the smoothing circuits 39 and 39' in FIG. 7 are applied to a pair of circuits 40 and 40', respectively, which are so designed as to produce a signal corresponding to the logarithm of the input signal thereto. The outputs from the circuits 40 and 40' are applied to a circuit 41 which is so designed as to produce an output signal corresponding to the difference between the two outputs logarithms from the circuits 40 and 40'. The output signal from the circuit 41 is applied to the recorder 32 in FIG. 4 or 7.

In FIG. 7, the beam switch 34a alternately directs the light from the monochromator to advance along the two paths and the second beam switch 34b causes the two beams to be projected through the single sample cell. The beam switch 34a may be replaced by a beam splitter similar to the one shown in FIG. 4 and the second beam switch 34b, by a device which causes the two beams B and B' on the two paths to be projected through the single cell, with a device disposed in the two beams so as to alternately intercept them so that they alternately pass through the single cell.

Having illustrated and described a preferred embodiment of the invention, it is to be understood that the invention is not limited thereto, and that there are many modifications and changes thereof without departing from the true scope and spirit of the invention as defined in the appended claims.

What is claimed is:

1. A spectrophotometer for measurement of derivative spectra of substances, comprising: means for providing monochromatic light, means for dividing said monochromatic light into two separate beams having the same spectral bandwidth; means separate from and positioned optically downstream from said dividing means in each of said beams for partially masking each said beam so that the unmasked portion of each said beam has a wavelength different by a predetermined value from that of the unmasked portion of the other beam; said masking means comprises a pair of plates each having a slit formed therein, the position of the slit on one of said plates relative to the optical axis of one of said beams being symmetrically displaced from the position of the slit on the other of said plates relative to the optical axis of the other of said beams; a pair of cells, one in each of said beams for containing a portion of the same sample to receive said unmasked portions of the light beams, respectively; a pair of means for detecting the intensities of light beams transmitted through said samples to generate electrical signals corresponding to said intensities of transmitted light; means for measuring said electrical signals to provide the ratio of said intensities of transmitted light; means for providing the logarithm of said ratio; and means for plotting the same against wavelength to provide a derivative spectra output record.

2. The spectrophotometer as defined in claim 1, wherein said first-named means comprises a single monochromator.

3. The spectrophotometer as defined in claim 1, wherein the widths of both said slits are variable.

4. The spectrophotometer as defined in claim 1, wherein said displacement of each of said slits is variable.

5. A spectrophotometer for measurement of derivative spectra of substances comprising: means for providing monochromatic light, means for dividing said monochromatic light into two separate beams having the same spectral bandwidth; means separate from and positioned optically downstream from said dividing means in each of said beams for partially masking each said beam so that the unmasked portion of each said beam has a wavelength different by a predetermined value from that of the unmasked portion of the other beam; said masking means comprising a pair of plates each having a slit formed therein, the positioned of the slit on one of said plates relative to the optical axis of one of said beams being symmetrically displaced from the position of the slit on the other of said plates relative to the optical axis of the other of said beams; a pair of cells, one in each of said beams for containing a portion of the same sample, to receive said unmasked portions of the light beams, respectively; a pair of means for detecting the intensities of light beams transmitted through said sample cells to generate electrical signals corresponding to said intensities of transmitted light; means for providing the logarithms of each of said electrical signals; means for providing an electrical signal corresponding to the difference between said logarithms; and means for recording said last-mentioned electrical signal to provide a derivative spectra output record.

* * * * *